United States Patent [19]

Warrick et al.

[11] Patent Number: 5,423,560

[45] Date of Patent: Jun. 13, 1995

[54] VARIABLE SPEED HYDRAULIC DRIVE, FOR SINGLE OR MULTI-WHEEL DRIVE BICYCLES AND THE LIKE

[76] Inventors: John J. Warrick, Rte. 2 Box 76; Robert M. Gilbert, H.C. 74 Box 13, both of Graham, Tex. 76450

[21] Appl. No.: 210,317

[22] Filed: Mar. 17, 1994

[51] Int. Cl.⁶ .................... B62M 1/02; B62M 19/00
[52] U.S. Cl. ..................... 282/216; 280/259
[58] Field of Search ............ 280/216, 214, 236, 259, 280/210; 91/505

[56] References Cited

U.S. PATENT DOCUMENTS

| | | | |
|---|---|---|---|
| 3,850,448 | 11/1974 | Stewart | 280/216 |
| 3,999,466 | 12/1976 | Aschke | 91/499 |
| 4,007,663 | 2/1977 | Nagatomo | 91/6.5 |
| 4,249,750 | 2/1981 | Kantner | 280/216 |
| 4,529,362 | 7/1985 | Ichiryu | 417/271 |
| 4,546,990 | 10/1985 | Harriger | 280/216 |
| 4,684,143 | 8/1987 | Sato | 280/216 |
| 4,688,815 | 8/1987 | Smith | 280/216 |
| 4,757,743 | 7/1988 | Torey | 91/6.5 |
| 4,772,185 | 9/1988 | Hertell | 418/3 |
| 4,787,828 | 11/1988 | Schweitzer | 417/271 |
| 4,934,251 | 6/1990 | Barker | 91/486 |
| 4,934,253 | 6/1990 | Berthold | 91/506 |
| 5,184,536 | 2/1993 | Arai | 91/505 |

FOREIGN PATENT DOCUMENTS 9117913  11/1991  WIPO ..................... 280/216

Primary Examiner—Margaret A. Focarino
Assistant Examiner—Kevin Hurley

[57] ABSTRACT

A hydraulic drive system is disclosed that has infinitely variable ratio without any need to reduce or remove power during shifts, requires very little effort to shift, and requires little or no effort to maintain shift position after shifting. It provides the ability to use single wheel drive, or multi-wheel drive with traction control, selectably. This invention may be used to power bicycles, but is not limited to bicycles as it may be built in any size or configuration.

6 Claims, 13 Drawing Sheets

VARIABLE SPEED HYDRAULIC DRIVE, FOR SINGLE OR MULTI-WHEEL DRIVE BICYCLES AND THE LIKE

BACKGROUND-FIELD OF INVENTION

This invention relates to hydraulic transmissions, primarily those used in bicycles.

BACKGROUND-DESCRIPTION OF PRIOR ART

Heretofore, nearly all bicycles have had a chain drive mechanism for the purpose of transmitting power from the rider to the rear wheel, In early models this was a single speed, chain and sprocket arrangement. The disadvantage of this mechanism is that you are almost never in the most advantagous gear ratio, Later came the three speed "in the hub" types, which while being an improvement over the single speed models, were far from being as economical, durable, or versatile as the industry required. Then came the derailleur, which is the current industry state of the art. The derailleur allows the use of multiple sprockets at the pedals, the rear wheel, or both, allowing ten, fifteen, or even more speeds. The problems of the derailleur are many and varied, The derailleur is expensive, delicate, the chain falls off frequently, and you must stop pedaling and even back pedal to make it work.

Therefore the advantage of multiple speeds is somewhat overshadowed by the disadvantage of having to remove power to shift, and stopping alongside the road to replace the chain.

The end result of this is that the more speeds you have the higher percentage of time that power is removed from the rear wheel, thereby losing time in a race or spending time on the side of the road replacing the chain.

Attempts have been made to overcome these drawbacks using hydraulic drive mechanisms, however they have been largely unsucsessfull due to the weight, expense, and physicaly unattractive plumbing which has been added to the conventional bicycle.

Multi-wheel drive has been addressed in both chain driven and hydraulic models. In chain driven models it has most recently been acomplished by a speedometer cable like device which is driven by the rear wheel and in turn drives the front wheel. This is less than desirable because some slippage is required before power is applied to the cable, and even more before usable torque is applied to the front wheel.

In hydraulic bicycles methods include using two pumps driven by a common shaft at the pedals, or using a single pump driving two motors from a single pressure source through a valving system.

The two pump system drives fluid through ten to fifteen feet of friction producing tubing, the front steering column or slip joint, and the front drive motor assembly. Therefore, even when on a good surface, and not needing the front wheel drive, you must still pump fluid through these power robbing devices.

The valved single pump system supplies pressure to two motors essentially through a "Y", into parallel hydraulic circuts, therefore if one wheel slips the pressure flows through it, leaving the wheel having good traction no longer having any pressure to drive it.

OBJECTS AND ADVANTAGES

Accordingly, several of the objects and advantages of the system described in this patent are:

(a) to provide a bicycle which has a variable speed non stepped drive system;
(b) to provide a bicycle with greater ratio capacity than any on the market, or currently patented;
(c) to provide a bicycle which may be shifted under full load;
(d) to provide a bicycle that contains a balanced shift mechanism which requires very little pressure to shift and no latches to maintain shift position;
(e) to provide a bicycle that has an improved reliability factor over the chain drive bicycle deraileur;
(f) to provide a bicycle which is lighter in weight and more attractive than current fluid drive bicycles;
(g) to provide a bicycle that has instant slip control through a series hydraulic system;
(h) to provide a bicycle which has a pressurized and sealed hydraulic system to eliminate contamination and seal leakage;

DRAWING FIGURES

FIG. 12 a, b, c, and d are views of the diverter valve.

DESCRIPTION OF INVENTION

FIGS. 1 to 15

Figure 1:
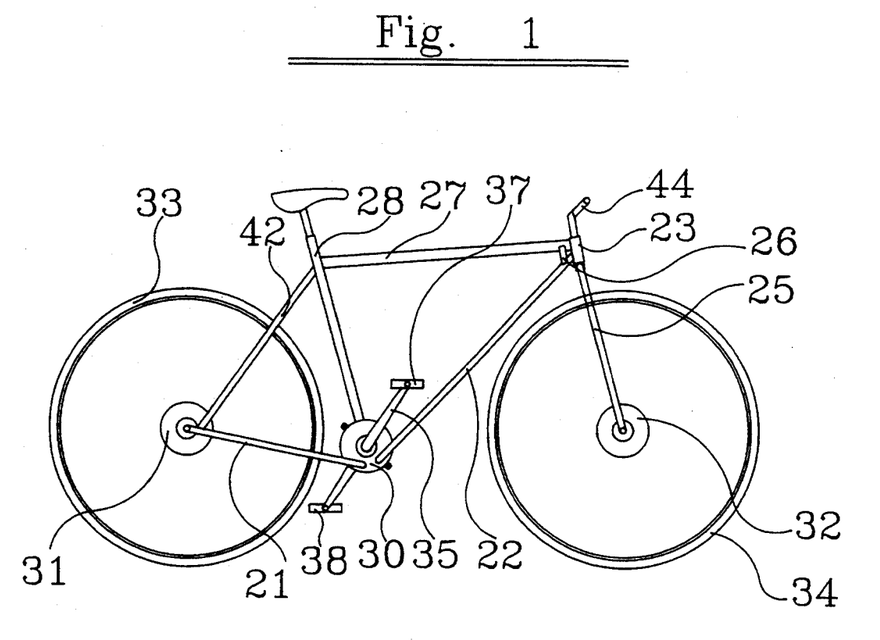
FIG. 1 is a side view of the bicycle with hydraulic drive system.
Figure 2:
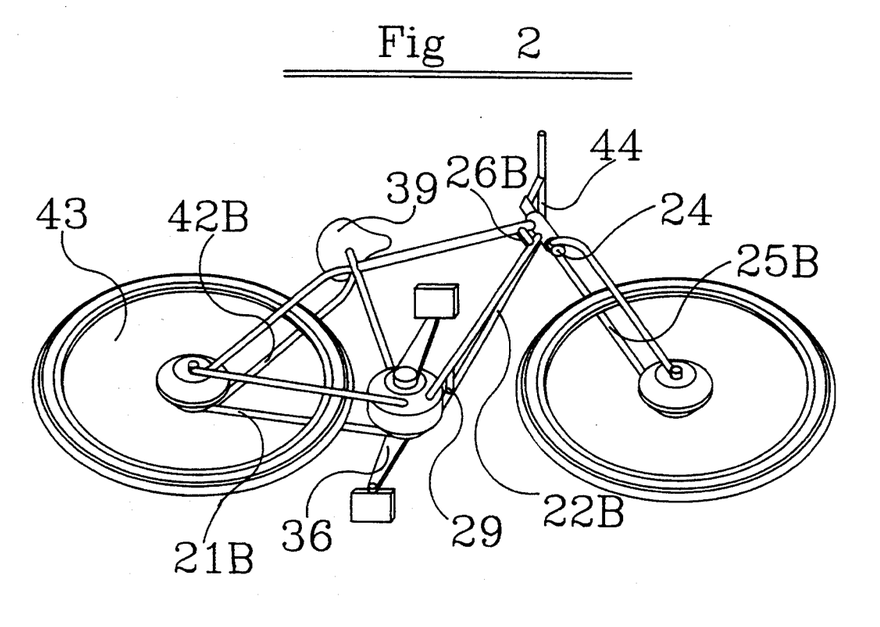
FIG. 2 is a 45 deg. tilted view illustrating fluid circuits.

FIGS. 1 and 2 show a side view and a tilted side view respectivly of the bicycle. The bicycle consists of a tubular frame, two wheel and tire assemblies, along with the seat and handlebar. The drive system of the bicycle is the pump assembly and the two motor assemblies.

The frame consists of tubular members which also function as fluid conduits. The lower left frame tube (21b) is attached at the front to the pump assembly (30) at the high pressure outlet (65) on the left side, and at the rear to the rear motor assembly (31), at the axle (91) on the left side. The lower right frame tube (21) is attached to the pump assembly (30), at the transfer port (64) on the right side, and at the rear, to the axle (91) of the rear motor assembly (31) on the right side. The front right frame tube (22) is attached at the lower end, to the transfer port (64) on the right side of the pump assembly (30), and at the upper end to the inlet port of the steering head (23). The front left frame tube (22b) is attached at the upper end to the left side of the steering head (23), and at the lower end to the return inlet (72) on the left side of the pump assembly (30). The upper frame tube (27) is attached at the front to the steering head (23), and at the rear to the seat tube (28). The seat tube (27) is attached at the lower end to the outer housing (59) of the pump assembly (30), and at it's upper midsection to the upper frame tube (27), the right rear frame tube (42), and the left rear frame tube (42b). The right rear frame tube (42) is attached at the upper end to the seat tube (28), and at the lower end to the lower right frame tube (21). The left rear frame tube (42b) is attached at the upper end to the seat tube (27), and at the lower end to the lower left frame tube (21b). The right crossover tube (26) is attached at the upper end to the upper frame tube (27), and at the lower end to the front right frame tube (22). The left crossover tube (26b) is attached at the upper end to the upper frame tube (27), and at the lower end to the front left frame tube (22b). The diverter valve assembly (29) is attached at the left end to the front left frame tube (22b), and at the right end to the front right frame tube (22).

The front fork section is comprised of a steering spindle (40) which is attached to the steering head (23) with bearings. The right front fork tube (25) is attached at the upper end to the steering spindle (24), and at the lower end to the axle of the front motor assembly (32). The left front fork tube is attached at the upper end to the steering spindle (24), and at the lower end to the axle of the front motor assembly (32).

The right pedal (37) is attached to the right crankset (35), which is attached to the input shaft (51) of the pump assembly (30). The left pedal (38) is attached to the left crankset (36), which is attached to the input shaft (51) of the pump assembly (30). The handlebar (41) is attached to the stem (44) which is attached to the steering spindle (40). The seat (39) is attached to the seat tube (28).

Figure 3:
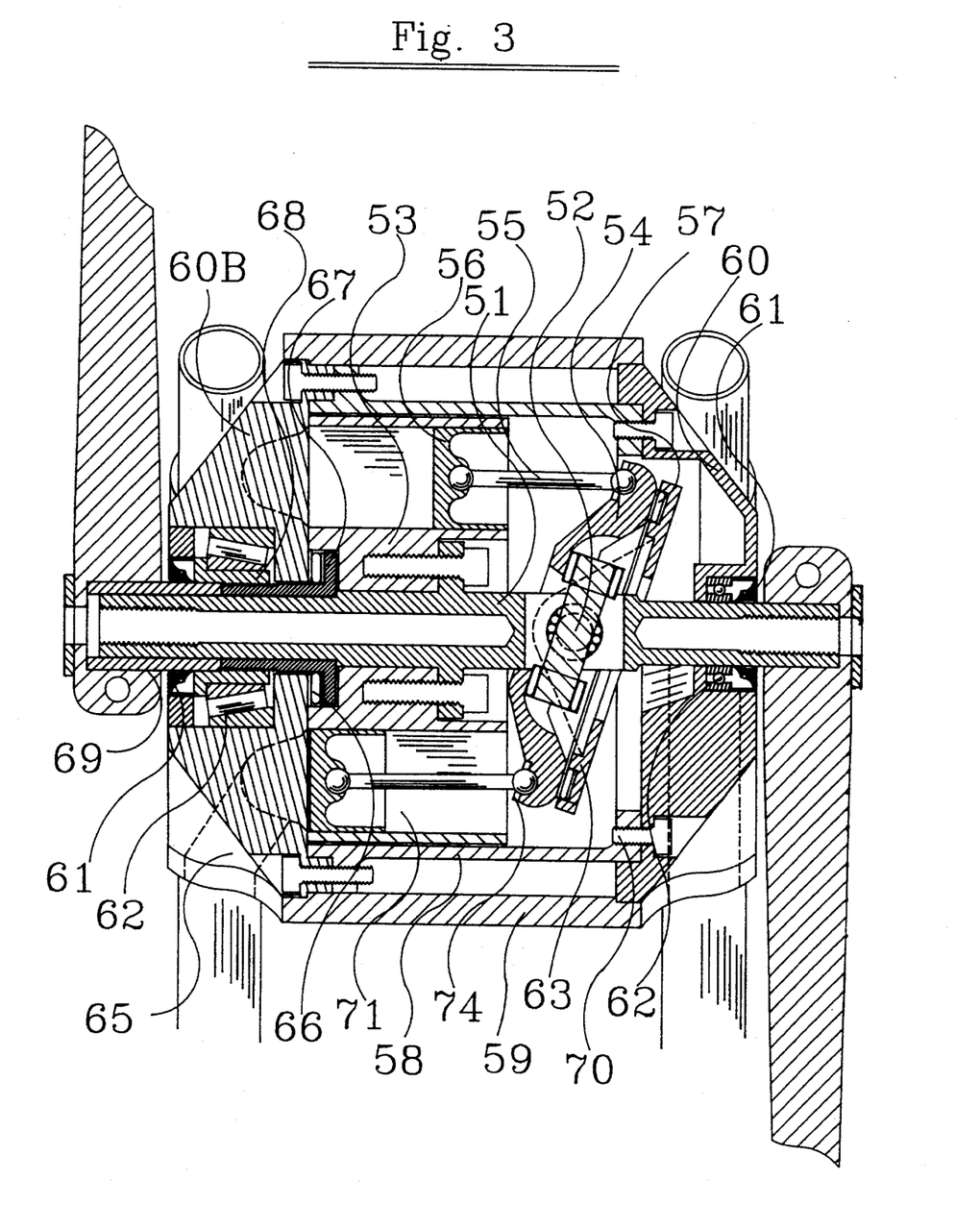
FIG. 3 is a cross section view of the pump.

FIG. 3 shows a cross section view of the pump assembly. The pump assembly is comprised of an inner housing (58) which spaces apart and aligns the left end bell (60b), and the right endbell (60). In the endbells (60,60b), are centeraly located bearings (62), and seals (61), in which is rotatably mounted the input shaft (51). On the input shaft (51), are mounted the cylinder block (53), and the universal joint (52). The cylinder block (53) contains a plurality of cylinder bores (71), in which are slidably mounted pistons (56). The pistons (56) are connected to connecting rods (55), which are connected at the opposite end to the rotor plate (54). The rotor plate (54) is mounted to the universal joint (52), and thereby to the input shaft (51). The shift plate (63) is angularly mounted to the inner housing (58), and controls the rotor plate (54) through a thrust bearing (57). The outer housing (59) is attached to the frame and retains the pump (30) therein. The transfer port (64) is a passage made into a solid area of the right endbell (60). The high pressure outlet (65) is a passage connected to the high pressure timing port (72) and exiting the end bell (60b). The return inlet is a passage connected to the suction port (112), and exiting the endbell (60b).

Figure 4:
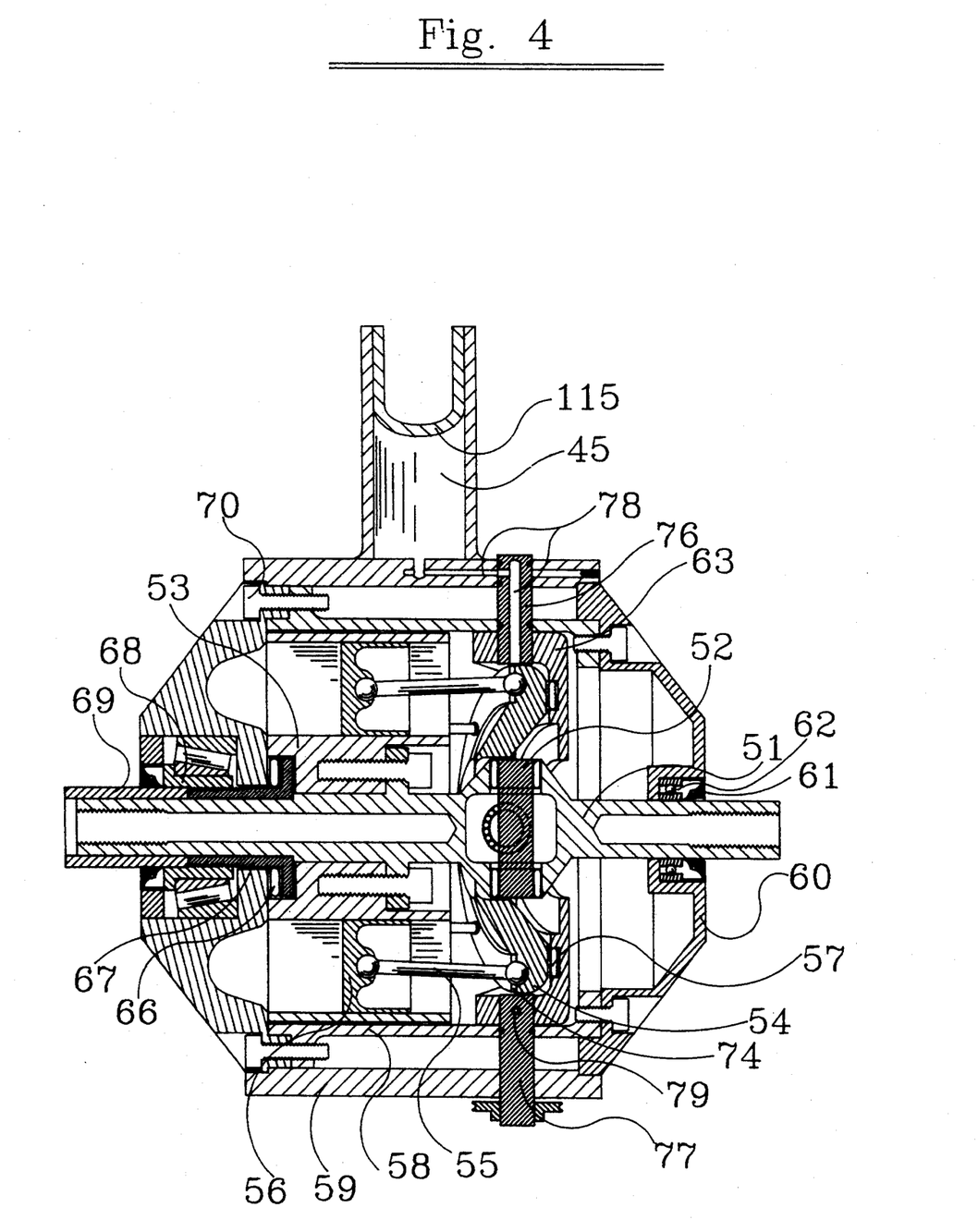
FIG. 4 is a cross section view of the pump rotated 90 degrees.

FIG. 4 shows the pump assembly (30) of FIG. 3 at a rotation of 90 degrees. Shown at a different perspective are the shift plate (63), the rotor plate (54), the input shaft (51), and the endbells (60,60b). Also added on this view is the shift mechanism (76).

Figure 5:
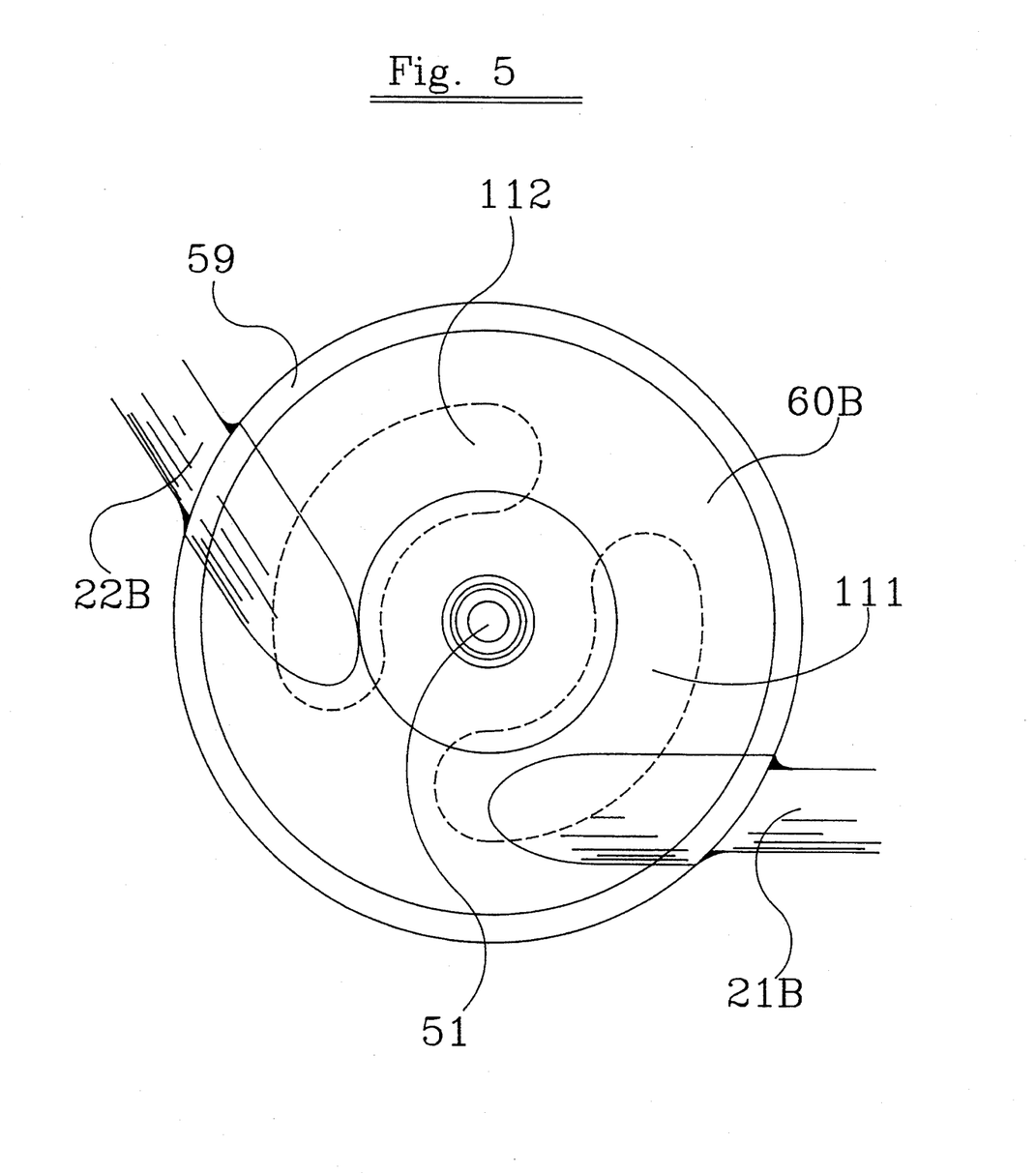
FIG. 5 is a left end view of the pump.

FIG. 5 shows a left side view of the pump assembly (30). Shown are the left endbell (60b) with the attached frame members, the lower left frame tube (21b), the front left frame tube (22b), and the seat tube (28). Also shown are the input shaft (51), and seal (61). The suction port (112), and the discharge port (111), are indicated by hidden lines.

Figure 6:
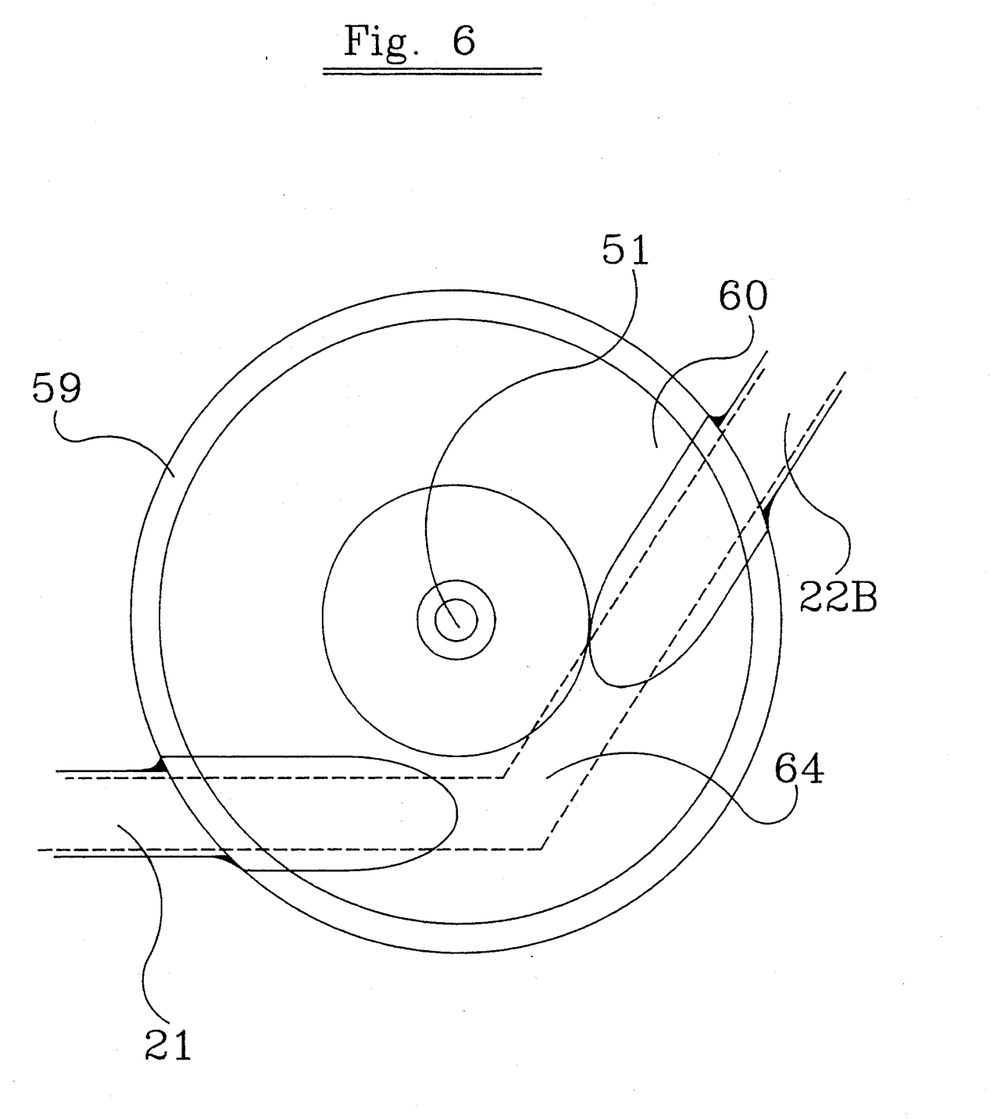
FIG. 6 is a right end view of the pump.

FIG. 6 shows a right side view of the pump assembly (30). Shown are the right endbell (60) with the attached frame members, the lower right frame tube (21), the front right frame tube (22), and the seat tube (28). also shown are the input shaft (51), and seal (61). The transfer port (75) is indicated by hidden lines.

Figure 7:
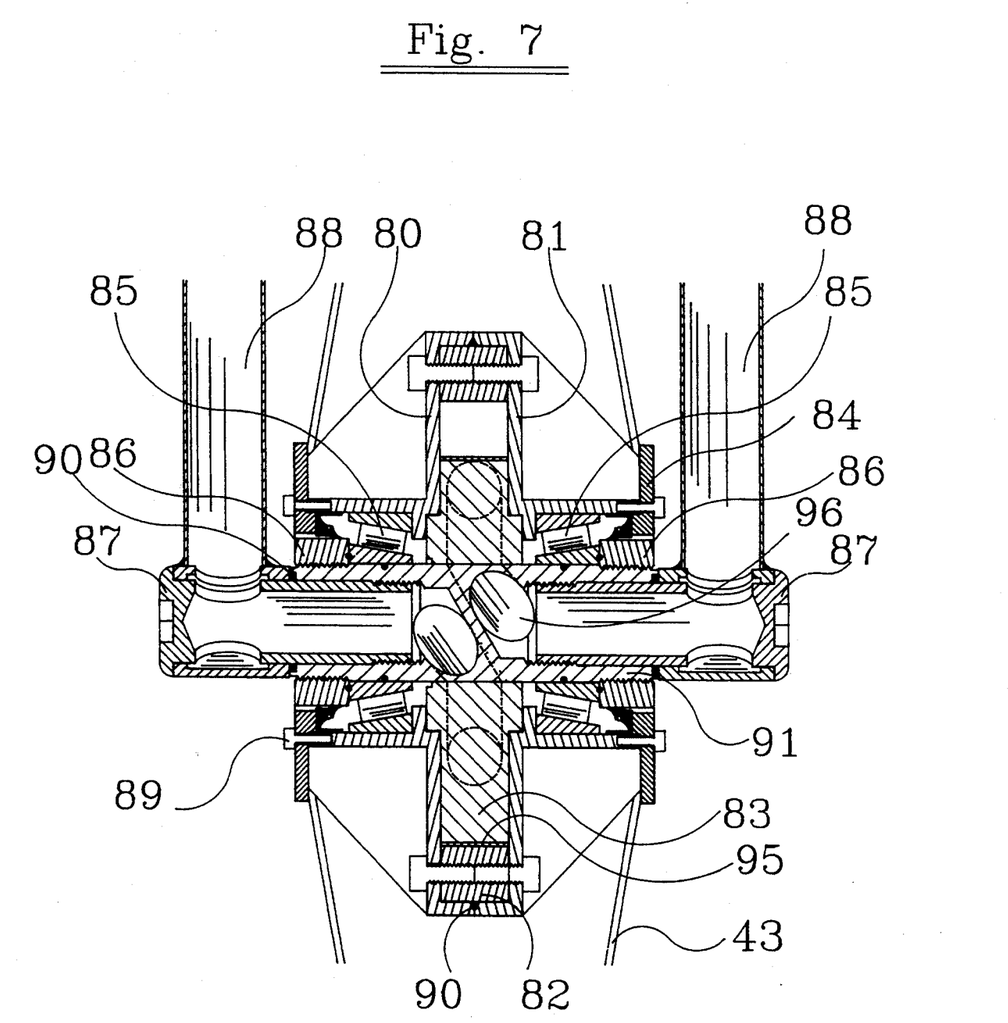
FIG. 7 is a front cross section view of the vane motor.

FIG. 7 shows a front cross section view of the vane motor. The vane motor consists of a left motor housing (80) and a right motor housing (81), which are attached to the motor rotor (82) at the circumference, and to the axle shaft (91) at the center through the bearings (85). The motor stator (83) is attached to the axle shaft (91) to maintain fluid communication with the ports in the axle shaft (91). The bearing retainer nuts (86) are threaded to the axle shaft (91), and the seals (92) are mounted in the motor housings (80,81), and run on the bearing retainer nuts (86).

Figure 8:
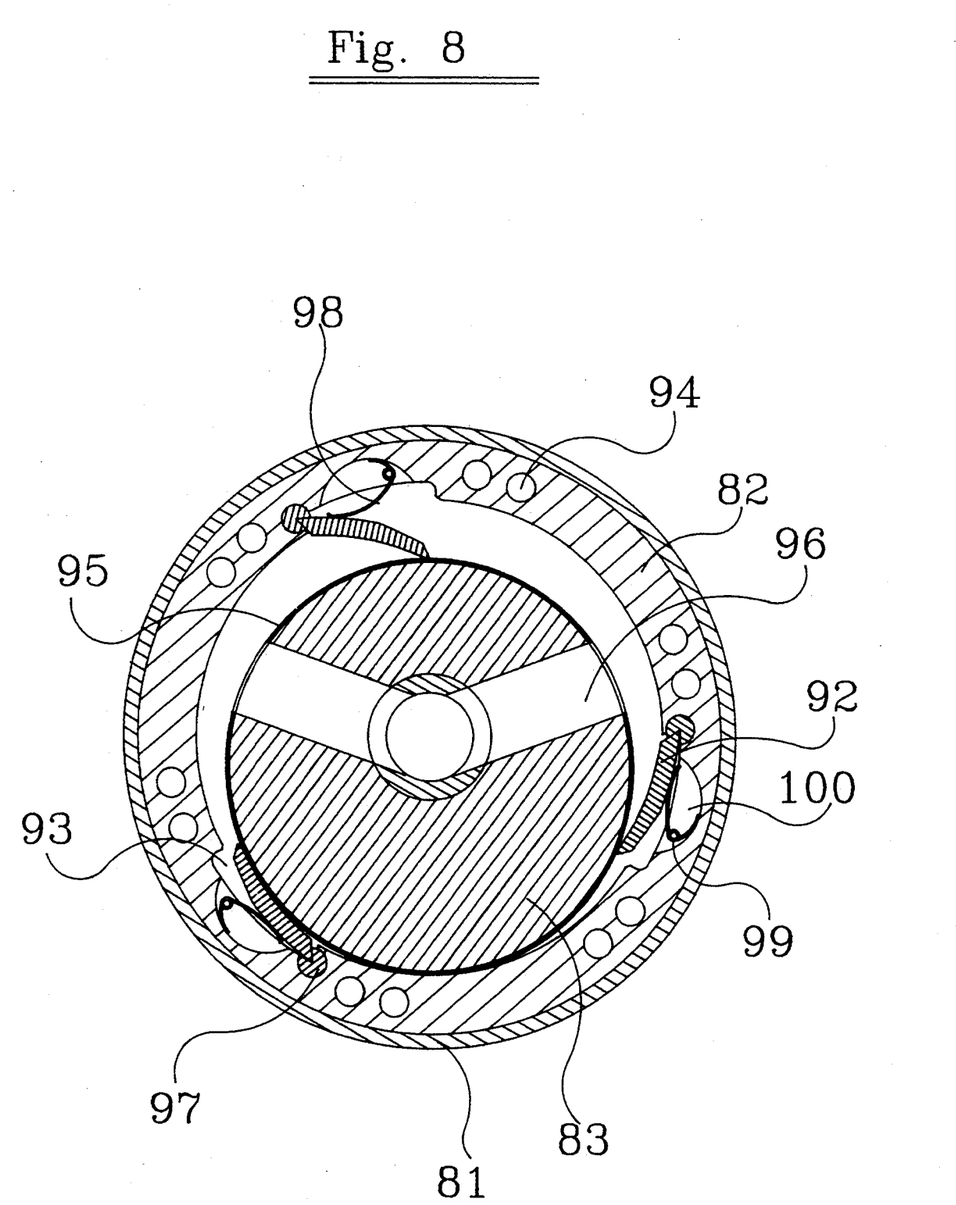
FIG. 8 is a side cross section view of the vane motor.

FIG. 8 shows the axle shaft (91), the motor stator (83), and the stator bearing surface (95). The vanes (92) are attached to the vane pivot pin (97), and the vane pivot pin (97) is rotatably mounted in the motor rotor (82). Also shown are the vane recesses (93), the fluid ports (96,96b), and the threaded mounting holes (94) for the motor housings (80,81).

Figure 9:
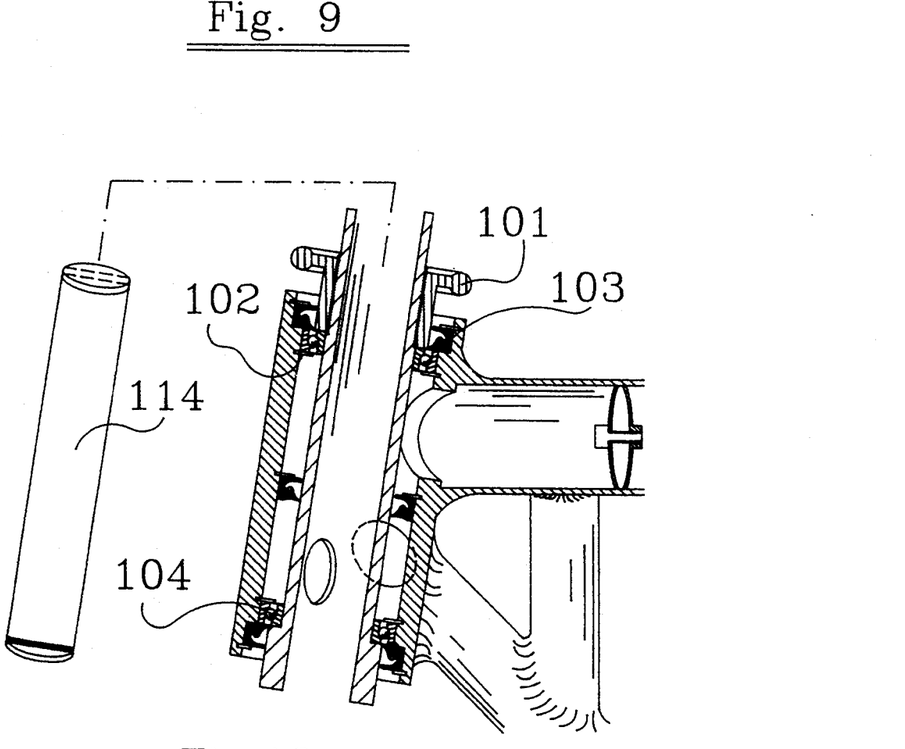
FIG. 9 is a side cross section view of the fluid circuits in the steering head as seen from the left hand side.

FIG. 9 shows a side cross section view of the steering head (23). Contained in it are the steering spindle (24), the dampner nut (101), the "C" clips (102), the seals (103), and bearings (104).8

Figure 10:
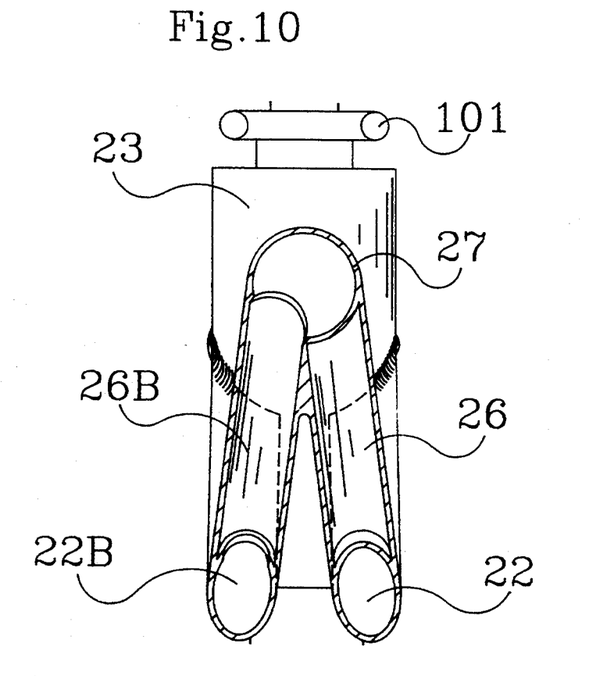
FIG. 10 is a rear cross section view along the A—A line of FIG. 9.

FIG. 10 shows the steering head (23), dampner nut (101), and a cross section of the upper frame tube (27), the crossover tubes (26,26b), and the front frame tubes (22,22b).

Figure 11:
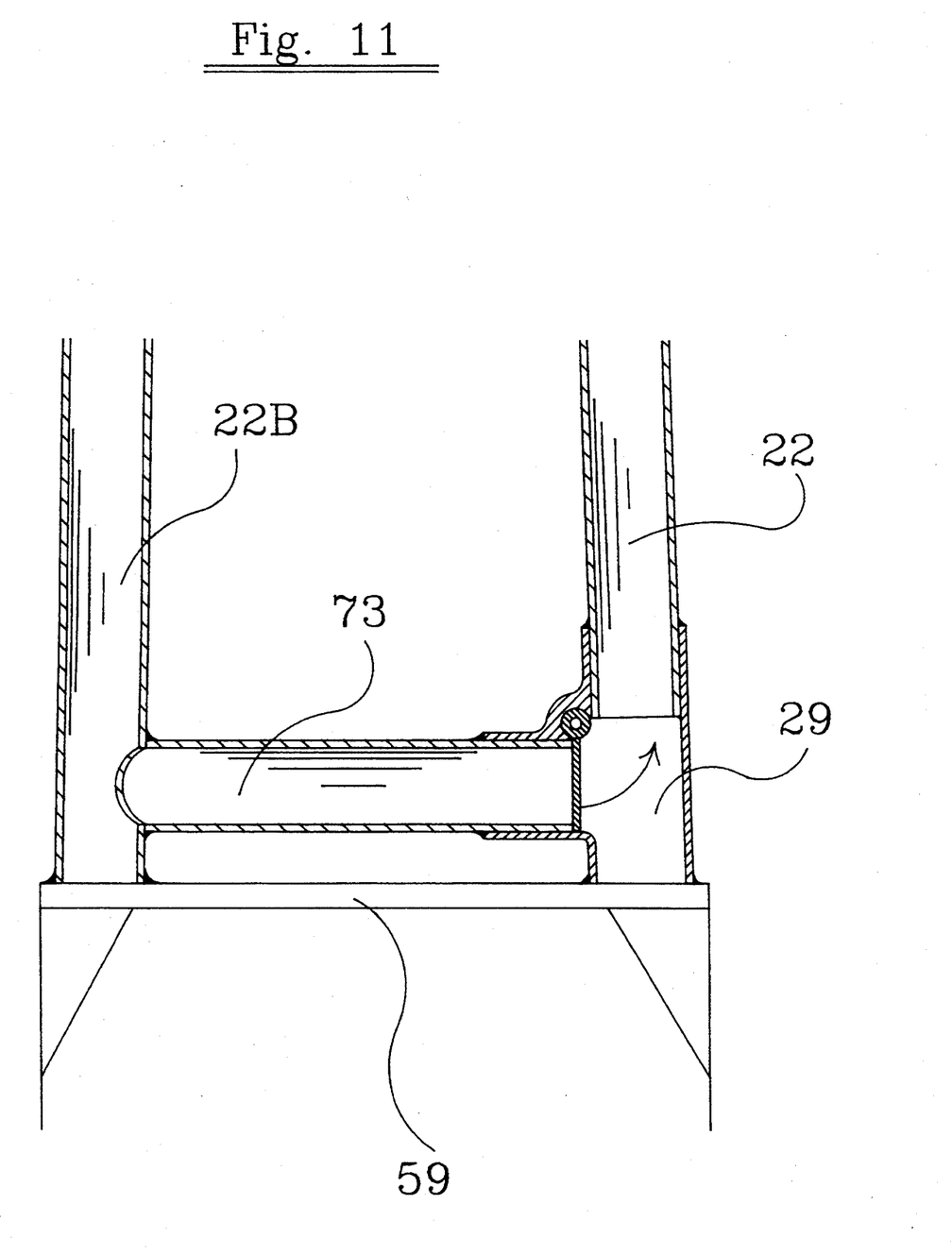
FIG. 11 is a top cross section view of the diverter valve.

FIG. 11 shows the outer pump housing (59), the front frame tubes (22,22b) and the diverter valve assembly. This assembly consists of the valve body (116), valve gate (117), valve gate pivot pin (118), and diverter tube (119), and is shown in the two wheel drive position.

Figure 12:
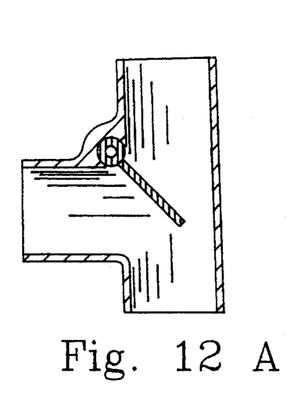

FIG. 12 shows in A, the assembled diverter valve, in B the the valve as seen from the left side, in C the valve as seen from the pump, and in D an exploded view of the gate (117), gate pivot pin (118), and its retainer (119).

Figure 13:
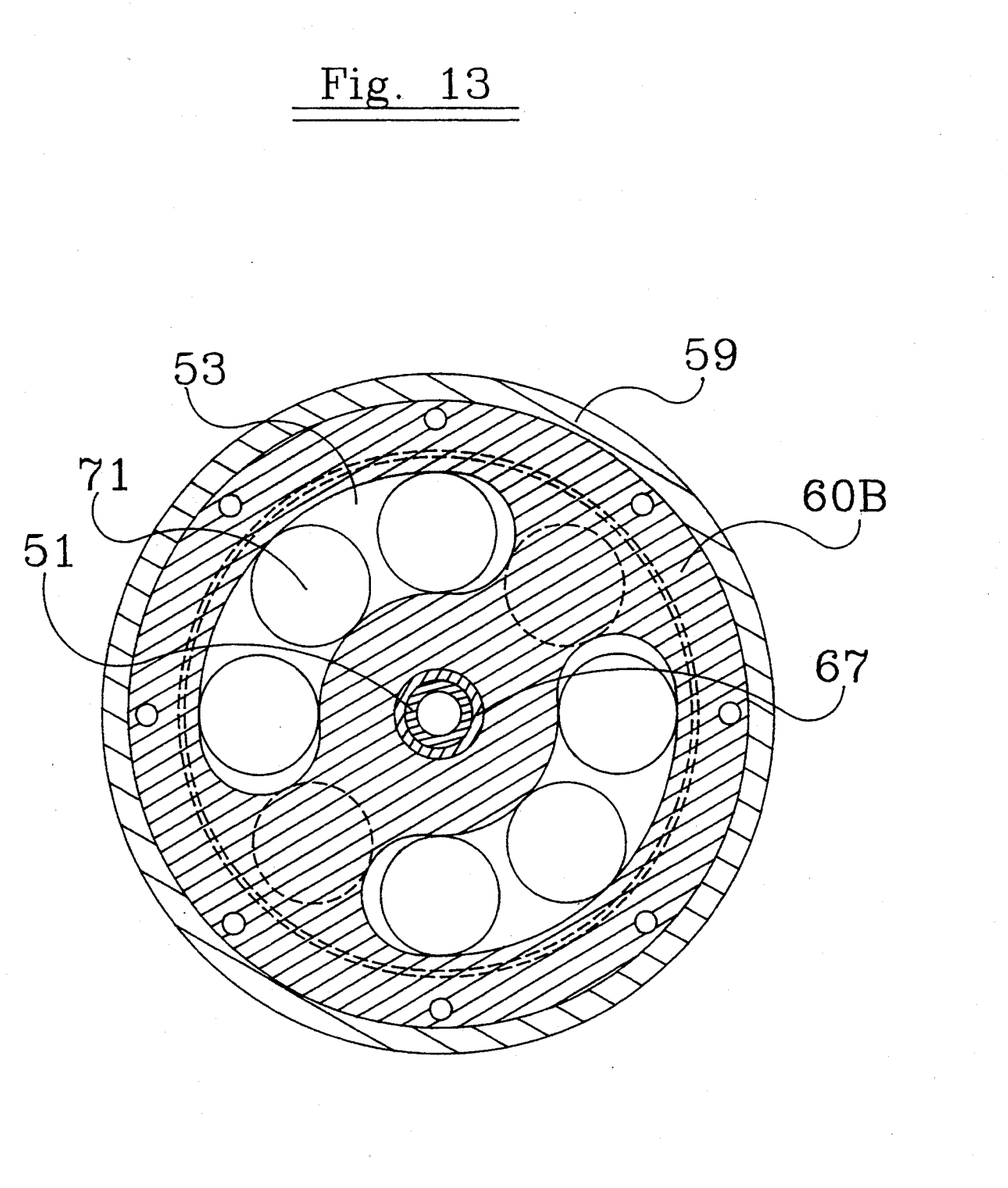
FIG. 13 is a cross section view along the B—B line of FIG. 4

FIG. 13 is a cross section view of the pump showing the outer housing (59), the ported section of the left endbell (60b), the cylinder block (53) and cylinders (71), and the input shaft (51) with bearing support collar (67).

Figure 14:
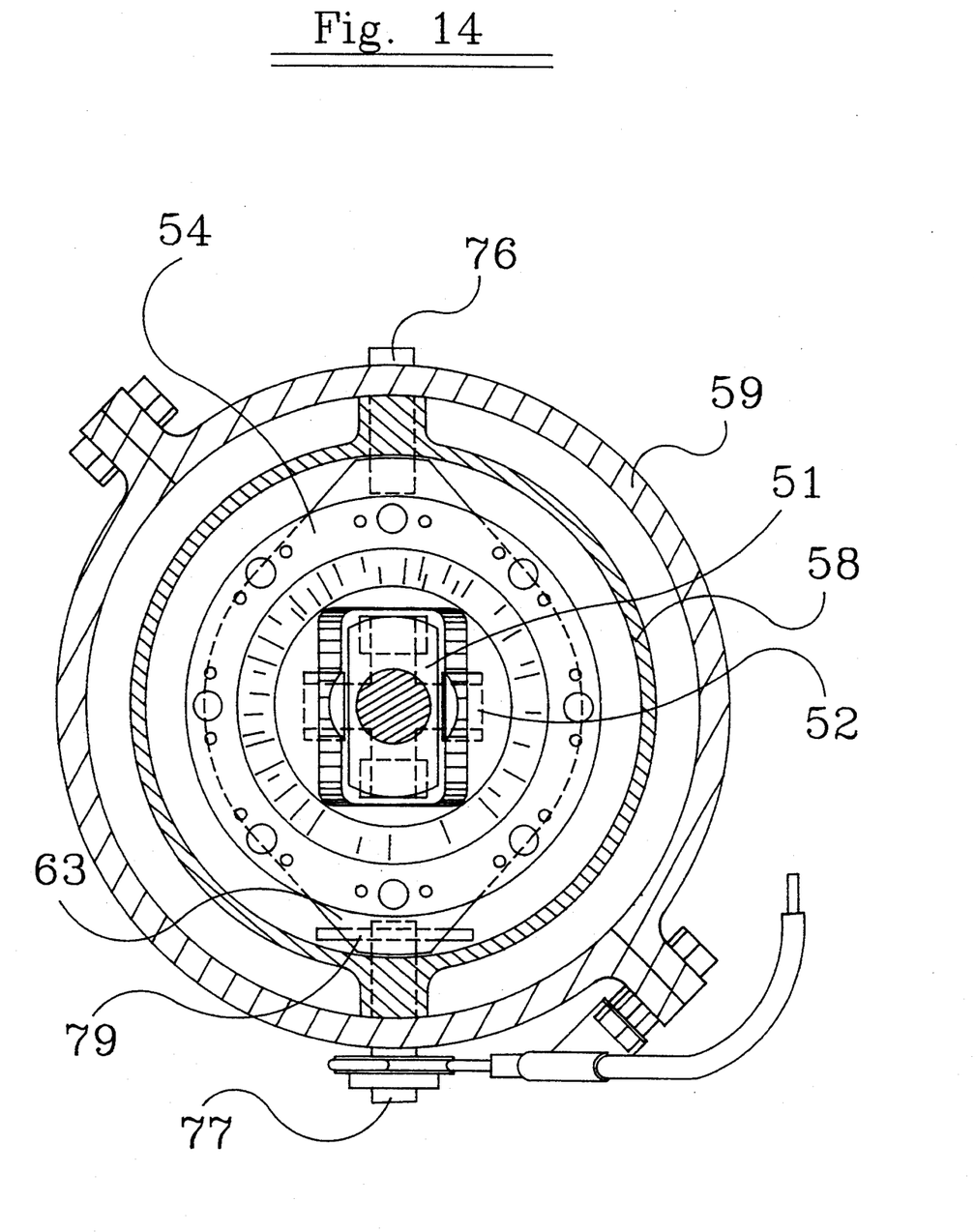
FIG. 14 is a cross section view along the C—C line of FIG. 4

FIG. 14 is a cross section view of the pump showing the outer pump housing (59), the inner pump housing (58), the rotor plate (54), pivot pins (76,77), shift plate (63), input shaft (51), universal joint (52), and drive pin (79).

Figure 15:
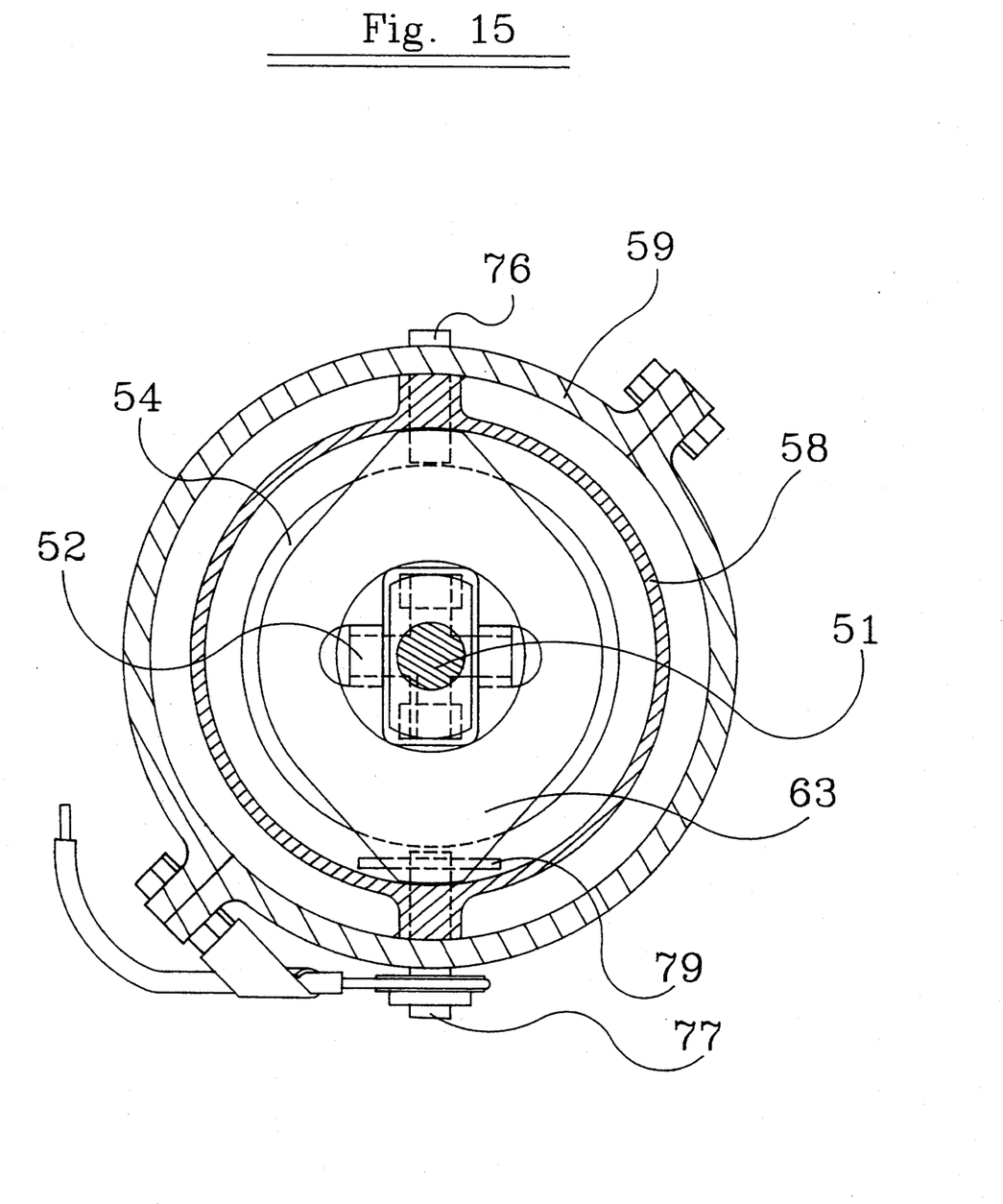
FIG. 15 is a cross section view along the D—D line of FIG. 4

FIG. 15 is a cross section view of the pump showing the inner and outer housings (58,59), input shaft (51) and universal joint (52), rotor plate (54) and shift plate (63), and the pivot pin (76), shift pin (77), and drive pin (79).

DESCRIPTION OF THE PREFERRED EMBODIMENTS

Refering now to the drawings, and particulary to FIGS. 1 and 2, there is shown a bicycle of the hydraulic drive type. Foward motion is achieved when weight is placed on the pedal (37,38) which converts this energy to rotational torque. When torque is applied to the input (51) shaft, the pump means generates fluid pressure and flow. The fluid is then directed through the lower left frame tube (21b) to the rear motor assembly (31). As the fluid passes through the rear motor assembly (31) it acts on the internal members to create rotational torque, this torque is then directed to the rear wheel assembly (33) by the spokes (43). The fluid then passes through the lower right frame tube (21) to the transfer port (75) in the pump assembly (30), and on to the front right frame tube (22). As the fluid reaches the steering head (23) it is directed by ports in the steering spindle (24) to the right front fork tube (25). The fluid then passes through the front motor assembly (32) generating torque for the front wheel (34) as it did in the rear. The fluid then passes through the left front fork (25b) tube to the steering spindle (24) and then to the steering head (23) where it is directed by ports in the steering head (23) to the upper frame tube (27), then to the left crossover tube (26b) and into the front left frame tube (22b). The fluid passes through the front left frame tube (22b) and back into the return inlet (72) and then to the suction port (112) of the pump assembly (30).

As seen in FIG. 3, rotational torque is applied to the input shaft (51) which is rotatably mounted in the end-bells (60,60b). This torque is then simultaneously applied to the cylinder block (53), and, through the universal joint (52), to the rotor plate (54), thus mantaining syncronized rotation. As the cylinder block (53) and the rotor plate rotate (54), the slidably mounted pistons (56) move in an linear motion which is relative to the distance from the port end of the cylinder (71), to the rotor plate (54). The distance from the port end of the cylinder (71) to the rotor plate (54) in changed by use of the shift plate (63). The shift plate (63) is rotatably mounted in the inner pump housing (58) perpendicular to the axis of the input shaft (51). One drive pin (76) extends through the outer housing (59) to link with the shift cable mechanism (77). The other pivot pin (78) extends into the outer housing (59) on the opposite side to provide a fluid communication between the inner pump housing (58), and the seat tube reservoir (45), to allow any trapped air to leave the active area of the system. On the face of the shift plate (63) is mounted a thrust bearing (57). This thrust bearing (57) transfers the angle placement of the shift plate (63) to the rotor plate (54), Thus causing a difference in the distance between tile port end of the cylinder (71) and the rotor plate (54). Further, due to the mounting of the rotor plate (54) to the input shaft (51) via the universal joint (52) there is on load carried by the shift plate (63), it must also be noted that due to there being as many pressurized pistons (56) on each side of the universal joint (52), the load is balanced on both sides. Given that there is no load on the shift plate (63) a nearly effortless shift may be accomplished and very little friction is required to mantain shift position. Thus, as seen in FIG. 3, given a clockwise rotation as seen from the right side, the lower piston (56) would begin a downward stroke causing a suction on the suction port (112), and filling the cylinder (71) with fluid. As the piston (56) achieves bottom dead center it loses fluid communication with the suction port (112) and the enters fluid communication with the discharge port (111). As the piston begins its upward stroke it discharges the fluid through the discharge port (111) until it comes to top dead center where it loses fluid communication with the discharge port (111) and begins the cycle again. By changing the angle of the shift plate (63) and thus the rotor plate (54), the distance between the port end of the cylinder (71) and the rotor plate (54) changes, causing a change in stroke. As seen in FIG. 3, the rotor plate (54) is at a large angle, giving a large displacement, whereas a more nearly straight angle would give smaller displacement. The other effect of the straighter angle is that, at the same torque level the pressure is higher, in effect giving a lower gear ratio.

As seen in FIG. 7 the motor assembly (31,32) is comprised of an axle (91) which is drilled, and threaded from each end, and ported in two places to intersect with the internal passages.

Also the ends are threaded to accept the bearing retainer nuts (86). Upon the axle (91) is fixidly attached a stator (83). The stator (83) containes ports (111,112) which provide fluid communication between the axle (91), and the working chambers, which are evenly spaced around the stator (83) in the rotor. The rotor (82) is rigidly mounted between two outer housing halves (80,81), which are rotatably mounted to the axle (91) on adjustable bearings (85). The bearings (85) are are axially adjusted by the bearing retainer nuts (86), to precisely locate the outer housings (80,81), in order to allow for close tolerances between the stator (83) and outer housings (80,81). Due to the high pressures involved the seals (103) are retained by the spoke drive ring (84). The spoke drive ring (84) retains the spokes (43) in the normal fashion, and is secured to the outer housing (80,81) by bolts or other attachment means. The fork tubes (25,25b) are attached to the axle (91) by means of a hollow axle bolt (87) with ports through the sidewall.

As may be seen in FIG. 8, the stator (83) is mounted to the axle (91) and has an eccentric lobe to seal the fluid at the bottom of the motor assembly (32,31). It has ports which drilled towards the center, and each is in fluid communication with one passageway in the axle. The rotor (82) is ridgidly fixed between the housing halves (80,81) and is drilled to accept the vane hinge pins (97), and has pockets to receive the vanes (92) when they are retracted. The pockets are also fitted with springs (98) to apply a slight pressure to the vane (92) to insure contact with the stator (83) until it is fully engaged by pressure. The ability of the vane (92) to fold up against a slight spring pressure allows a sprag effect to take place without any additional parts. If the wheel is moving, but the pedaling stops, and thus fluid flow stops, the vanes (92) ride over the stalled fluid.

As the high pressure fluid leaves the discharge port (111), it enters the lower left frame tube (21b) and moves to the inlet of the rear motor assembly (31). The inlet of the motor assembly (31) is a hollow portion at the end of the axle (91), which is fixidly attached to the lower left frame member (21b). The fluid passes through the hollow portion of the axle (91) and exits via a port in the sidewall of the axle (91). The trailing edge of the inlet port (96), and the leading edge of the outlet port (96b) are spaced 120 degrees apart, thus allowing pressure to act on only one vane (92) at a time. Also this allows the vanes (92) to seal between the ports (96,96b)

on the upper side. As the fluid enters the working chamber, it applies pressure to the vane (92) between the inlet (96) and outlet (96b) ports. This pressure is transfered through the vane hinge pin (97) and into the rotor (82) thus driving the rotor (82), spokes (43), and wheel assembly (33,34). As the vane (92) in the working chamber begins to pass the outlet port (96b) the fluid is in communication with the outlet port (96b) and exits to the lower right frame tube (21).

Refering to FIG. 6, it may be seen that as the fluid reaches the pump assembly (30) it is transfered to the front right frame tube (22) by the transfer port (75).

Refering now to FIG. 9, as the fluid reaches the steering head (23) it enters through a port in the side of the steering head (23). The port communicates with a relieved area which surrounds the steering spindle (24) and is defined at its ends by seals (103). The steering spindle (24) is a hollow tube with a divider plate (114) in the center along the longitudinal axis and a cap at each end, which prevents communication between the high and low pressure fluids. The fluid enters through a port in the side of the spindle (24), travels downwards, and exits through another port near the base of the spindle (24), which is in communication with the right front fork (25). From the right front fork (25), the fluid enters and drives the front motor assembly (32) the same as it did in the rear motor assembly (31). As the fluid exits the motor assembly (32) it moves upward through the left front fork tube (25b), back to the steering spindle (24). At the steering spindle (24) the fluid enters through a port on the opposite side of the divider plate (114), and exits through a port into a relieved area which surrounds the steering spindle (24) and whose ends are defined by seals (103). From this relieved area the fluid passes into the upper frame tube (26), where after a short distance it is blocked and diverted through the left crossover tube (26b) and into the front left frame tube (22b). The front left frame tube (22b) carries the fluid back to the suction port of the pump assembly (72).

As may be seen in FIG. 11, the fluid may be diverted from the front right frame tube (22) to the front left frame tube (22b) after it leaves the transfer port (75). This is to allow one wheel operation when two wheel drive is not nessesary. The advantage of this is to eliminate the resistance on the fluid as it passes through the front wheel drive mechanism. However in this figure it is drawn in the two wheel drive position.

In order to mantain seal pressure, to assure consistant sealing, an air bladder (115) is inserted into the seat tube (28), as seen in FIGS. 4 and 11. The air bladder mantains a low pressure on the seals, and due to its removability, provides a convenient location for filling with fluid.

SUMMARY, RAMIFICATIONS, AND SCOPE

Accordingly it will be seen that the hydraulic drive mechanism of this invention, can be used to drive a bicycle or similar device, with ease and convenience. Furthermore it has the following advantages.

It may be expected to operate more reliably due to the lack of a chain or associated deraileur mechanism.

It may be expected to operate more efficently than a conventional bicycle due to an infinitely variable speed range rather than a multi-speed sprocket system.

It provides a two wheel drive system.

It provides the ability to easly disconnect the front wheel drive for improved efficiency.

It provides a greater range of ratios than is currently availiable.

It provides a hydraulic system sealed from dirt and moisture.

It provides an instant traction control for the wheels.

Although the description above contains many specifics, these should not be construed as limiting the scope of the invention, but merely providing illustrations of some of the presently prefered embodiments of this invention. For example the frame could have a different configuration, or the motors could be a smaller version of the pump being driven by the fluid. Or it could be a single wheel drive version.

Thus the scope of the invention should be determined by the appended claims and their legal equivalents, rather than by the examples given.

That which we claim is:

1. A bicycle of hydraulic drive design which comprises:
   a frame whose members comprise a hydraulic circuit, two axles which are coupled to, and in fluid communication with, said frame, on each of which is mounted a collapsible rotary vane hydraulic motor with an attached wheel assembly, an infinitely variable output, axial displacement, piston type, hydraulic pump, mounted to and in fluid communication with the frame, with an adjustment means which is externally manually controlled, a handlebar, and a seat.

2. A bicycle as in claim 1 wherein said pump includes a cylindrical outer housing, each end of which is defined by an endbell, which each contain bearings and seals, and further, one of which contains a transfer port, the other contains a suction port in combination with an annular cavity to form an intake for said pump, and a discharge port in combination with an annular cavity to form a discharge for said pump, a shaft rotatably mounted in the bearings upon which is mounted a cylindrical cylinder block in which are formed a plurality of axially spaced apart bores in which are slidably mounted pistons, in a base of which are formed sockets to recieve ball ended connecting rods that, at an opposite end connect to a rotor plate, said rotor plate being mounted to shaft by means of a universal joint, and controled by a shift plate which is pivotally mounted to said outer housing, on pivot pins, of which one extends through said outer housing to provide communication with an external control.

3. A bicycle as in claim 1, containing a rotor plate is controlled by a shift plate, and whereas said rotor plate has an equal number of pressurized pistons on either side of the pivot pin of said shift plate, and also has an equal number of non-pressurized pistons on either side of said pivot pin of said shift plate.

4. A bicycle as in claim 1, containing a rotor plate which is flexibly mounted to a shaft by use of a universal joint.

5. A bicycle as in claim 1, containing two outer housing halves which each contain seals and bearings, and are fixedly mounted to, and enclose, a rotor, wherein are formed recesses to accomodate vanes, pivot holes to receive vane pivot pins, recesses to acomodate vane deployment springs, holes to receive spring retainer pins, and threaded holes for mounting bolts, further comprising vanes which are fixedly mounted to vane pivot pins that are rotatably mounted in said vane pivot holes, vane deployment springs rotatably mounted on spring retainer pins, also comprising a stator fixedly mounted to an axle and having formed in it ports to provide fluid communication and timing, and an axle in which are formed passages to provide fluid communication between the frame members and the stator.

6. A bicycle as in claim 1, containing hinged vanes which are pivotally mounted in a rotor and further that an opposite end of each vane mantains slidable contact with a stator in which are formed accurately located inlet and discharge ports.

* * * * *